United States Patent
Iyer et al.

(10) Patent No.: US 10,860,032 B2
(45) Date of Patent: Dec. 8, 2020

(54) SYSTEM AND METHOD FOR ADAPTIVE INFRARED EMITTER POWER OPTIMIZATION FOR SIMULTANEOUS LOCALIZATION AND MAPPING

(71) Applicant: Dell Products, LP, Round Rock, TX (US)

(72) Inventors: Vivek Viswanathan Iyer, Austin, TX (US); Yagiz C. Yildiz, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 128 days.

(21) Appl. No.: 16/173,747

(22) Filed: Oct. 29, 2018

(65) Prior Publication Data

US 2020/0133300 A1     Apr. 30, 2020

(51) Int. Cl.
| | |
|---|---|
| G05D 1/02 | (2020.01) |
| G01C 25/00 | (2006.01) |
| G06K 9/00 | (2006.01) |
| G06K 9/62 | (2006.01) |
| G02B 27/01 | (2006.01) |

(52) U.S. Cl.
CPC ......... *G05D 1/0272* (2013.01); *G01C 25/005* (2013.01); *G02B 27/0172* (2013.01); *G05D 1/0246* (2013.01); *G06K 9/00369* (2013.01); *G06K 9/6229* (2013.01); *G06K 9/6292* (2013.01)

(58) Field of Classification Search
None
See application file for complete search history.

(56) References Cited

U.S. PATENT DOCUMENTS

| | | |
|---|---|---|
| 6,922,632 B2 | 7/2005 | Foxlin |
| 7,689,321 B2 | 3/2010 | Karlsson |
| 7,774,158 B2 | 8/2010 | Domingues Goncalves |
| | (Continued) | |

OTHER PUBLICATIONS

S. Riisgaard and M. Rufus Bals, "SLAM for Dummies, a Tutorial Approach to Simultaneous Localization and Mapping," May 2005, 127 pages.

(Continued)

*Primary Examiner* — Peter D Nolan
*Assistant Examiner* — Demetra R Smith-Stewart
(74) *Attorney, Agent, or Firm* — Prol Intellectual Property Law, PLLC; H. Kenneth Prol

(57) ABSTRACT

A wearable headset information handling system infrared emitter power optimization system may comprise a memory storing an association between an active infrared (IR) light emitter mounted to the wearable headset and a calibration intensity at which the IR light emitter emits light during a calibration phase, wherein the active IR light emitter is identified based on its position with respect to the field of view of the wearable headset. A SLAM engine may determine a calibration distance between the active IR light emitter and a first farthest identified object and determine an image projection distance between the active IR light emitter and a nearby virtual object. The processor may determine a first light intensity cap for the active IR light emitter based on the calibration distance, the calibration intensity, and the image projection distance, and the active IR light emitter may emit light according to the first light intensity cap.

20 Claims, 8 Drawing Sheets

(56) References Cited

U.S. PATENT DOCUMENTS

| | | | | |
|---|---|---|---|---|
| 8,467,133 | B2* | 6/2013 | Miller | G02B 27/017 353/28 |
| 8,649,565 | B1 | 2/2014 | Kim | |
| 8,718,837 | B2 | 5/2014 | Wang | |
| 10,126,815 | B2* | 11/2018 | Vidal | G01S 17/88 |
| 2005/0182518 | A1 | 8/2005 | Karlsson | |
| 2005/0238200 | A1 | 10/2005 | Gupta | |
| 2010/0094460 | A1 | 4/2010 | Choi | |
| 2014/0160250 | A1 | 6/2014 | Pomerantz | |
| 2014/0350839 | A1 | 11/2014 | Pack | |
| 2015/0178939 | A1 | 6/2015 | Bradski | |
| 2015/0304634 | A1 | 10/2015 | Karvounis | |
| 2017/0123489 | A1* | 5/2017 | Guenter | G06T 19/006 |
| 2017/0206691 | A1* | 7/2017 | Harrises | G02B 27/0172 |
| 2017/0206712 | A1* | 7/2017 | Petrovskaya | G06T 19/006 |
| 2019/0004228 | A1* | 1/2019 | Bevensee | G02B 6/08 |
| 2019/0278091 | A1* | 9/2019 | Smits | H04N 13/363 |
| 2019/0355136 | A1* | 11/2019 | Ortiz Egea | H04N 5/33 |
| 2020/0097065 | A1* | 3/2020 | Iyer | G06F 3/011 |

OTHER PUBLICATIONS

S. Frintrop, P. Jensfelt and H. Christensen, "Detecting Useful Landmarks for Visual SLAM," Workshop Robotic 3D Environment Cognition, at the International Conference Spatial Cognition, Bremen (Germany), Sep. 2006, 5 Pages.

M. Zeeshan Zia, L. Nardi, A. Jack, E. Vespa, B. Bodin, P.H.J. Kelly and A.J. Davison, "Comparative Design Space Exploration of Dense and Semi-Dense SLAM", Mar. 2016, 9 pages.

J. Tang, S. Liu and J.L. Gaudiot, "Embedded Systems Architecture for SLAM Applications," Feb. 2017, 4 pages.

Google Developers, "ARCore Overview," Sep. 2018, 3 pages.

Apple Developers, "ARKit," Sep. 2018, 6 pages.

Google Developers, "Fundamental Concepts," Sep. 2018, 5 pages.

E.B. Olson, "Real-Time Correlative Scan Matching," 2009, 7 pages.

H. Rao and W.T. Fu, "Combining Schematic and Augmented Reality Representations in a Remote Spatial Assistance System," Oct. 2013, 6 pages.

J. Sola, "Simultaneous localization and mapping with the extended Kalman filter," Oct. 2014, 35 pages.

\* cited by examiner

SYSTEM AND METHOD FOR ADAPTIVE INFRARED EMITTER POWER OPTIMIZATION FOR SIMULTANEOUS LOCALIZATION AND MAPPING

FIELD OF THE DISCLOSURE

The present disclosure generally relates to head mounted displays for information handling systems. The present disclosure more specifically relates to optimizing intensities emitted by infrared emitters of a head mounted display information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a head mounted user interface and/or display.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
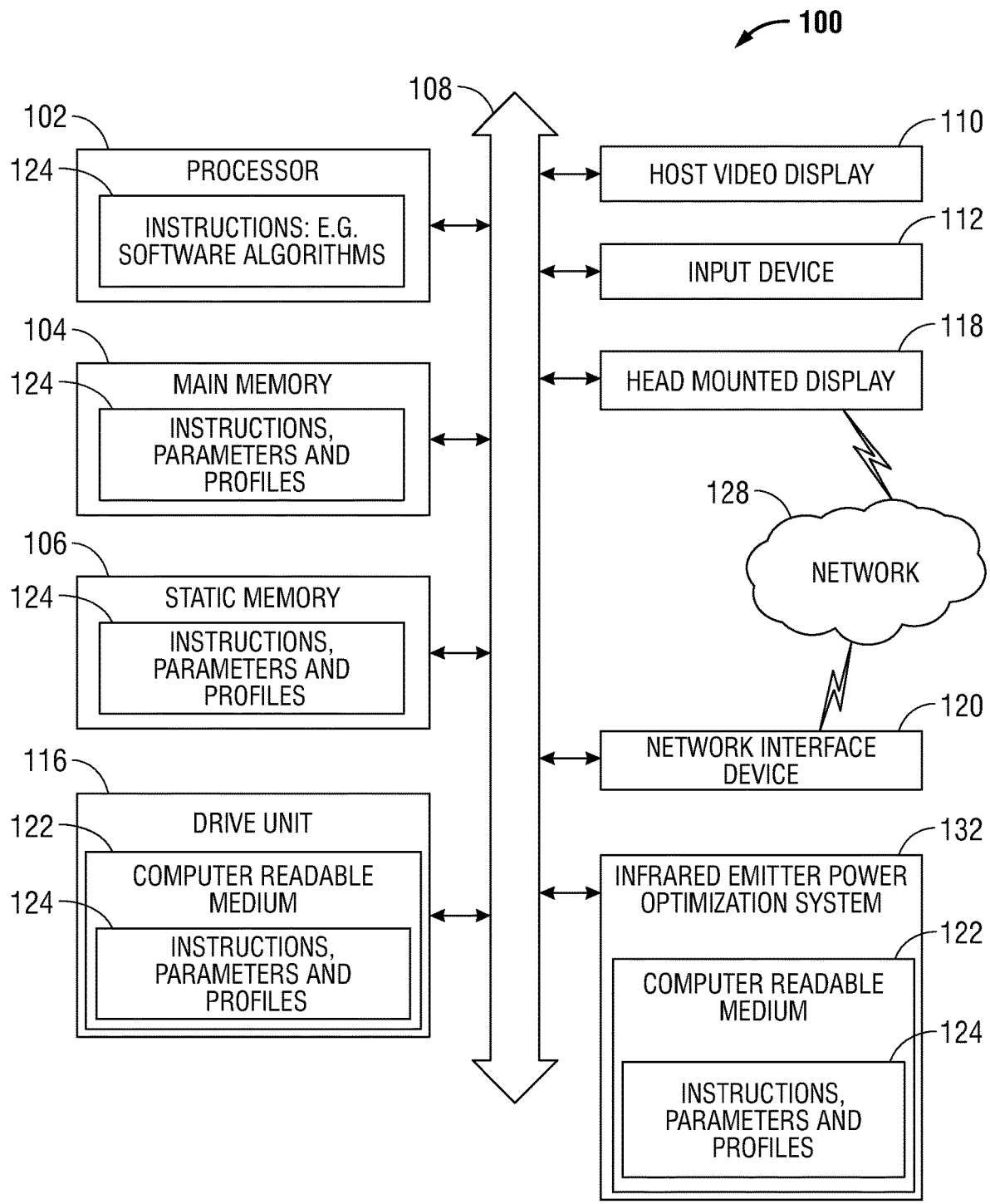
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Head mounted display devices, wearable around the user's head and/or eyes and having the capability of reflecting projected images and/or allowing the user to see through it may be used with augmented or virtual reality display systems. Head mounted display devices capable of generating augmented reality (AR) and/or virtual reality (VR) user interfaces are finding widespread use in workplaces. Modalities and applications such as AR/VR assisted construction, design and engineering, and first responder efforts are gaining in popularity along with AR/VR in the gaming industry. An example use of an AR/VR assisted design and engineering project may include the use of a head mounted display device to visualize proposed designs for wheelchair accessible ingresses/egresses for various doors on a pre-built factory floor or established commercial building. Such an application of AR/VR assisted design and engineering may require the wearer of the headset to move freely about the commercial building in order to view each of the doors under consideration.

Previous incarnations of head mounted display devices capable of generating such AR/VR user interfaces required the head mounted display device to be tethered to a laptop or desktop computer, which significantly reduces mobility of the headset. Headsets in such previous solutions were tethered to the laptop or desktop computer via a plurality of cables. For example, headsets in previous systems may have been tethered by a bus capable of transmitting graphics data, such as a mini high definition multi-media interface (HDMI), allowing the system to offload processing associated with identifying the position of the headset with respect to its surrounding environment, modeling the surrounding environment as viewed from the perspective of the headset wearer, and rendering the modeled image in a three-dimensional environment matching the surrounding real-world environment to the laptop. Such processes are referred to as simultaneous localization and mapping (SLAM) and were carried out by multiple components within the headset and/or the tethered laptop or desktop computing device. As another example, headsets in previous systems may have been tethered by a power cord to either a laptop or an AC outlet in order to power the several components of the headset. Among the components of the headset drawing power, a plurality of infrared emitters mounted around the exterior of the headset traditionally consumed a disproportionally large amount of power. A system that allows the headset to be untethered to the laptop/desktop/AC outlet, or to be tethered to a laptop/desktop via only one cable is needed in order to increase mobility of the headset.

Embodiments of the present disclosure address this issue by adaptively optimizing the intensity of light emitted from the plurality of infrared emitters mounted on the headset. In such a way, the power consumed by these infrared emitters in some embodiments of the present disclosure may be similarly decreased such that a battery housed within the headset may provide all necessary power, and the headset may be completely untethered. In other embodiments of the present disclosure, the power consumed by these infrared emitters such that the total power required by the headset falls below a power draw requirement associated with the Universal Serial Bus Type-C (USB-C) power draw requirements. In such embodiments, the headset may then be tethered to a laptop or desktop via a single USB-C cord.

Optimizing intensity of light emitted from the plurality of infrared emitters in embodiments of the present disclosure may involve determining a minimum intensity at which one of more infrared (IR) emitters may emit light while successfully executing SLAM processing. A SLAM process may involve real-time processing of the current location of a headset within a surrounding environment and simultaneous predictive processing of a future position of the headset. The real-time SLAM processing may begin by determining the location of the headset within its surrounding environment and projecting an image within the headset (either of the full surrounding environment as in VR, or of an object viewed as being incorporated within the surrounding environment as in AR) from the perspective of the headset. In order to accurately project what the surrounding environment looks like in real life from the perspective of the headset (which may be opaque such that surrounding environment cannot be viewed), or to project an object such that it accurately incorporates into the viewable surrounding environment, the position of the headset within the surrounding environment may be accurately determined. A real-time SLAM process may gauge the location of the headset within its environment by either determining the location of the headset with respect to a previous known location of the headset or with respect to one or more landmarks within the surrounding environment.

Embodiments of the present disclosure may use an inside-out localization process to determine the position of a head mounted display from one or more landmarks identified within a three-dimensional image of such landmarks. Each instance in time at which such an image is captured may be associated with an instantaneous perspective of the surrounding environment from the headset, accompanied by identification of those landmarks and their distances from the headset, referred to as a SLAM frame. Distance between the head mounted display and each landmark in embodiments of the present disclosure may be determined via the use of the plurality of IR emitters mounted on the headset. For example, an IR emitter may emit IR light at a given intensity toward a landmark, and the distance between the IR emitter and the landmark may be determined by analyzing the way in which the IR light reflected off the landmark, back toward an IR sensor onboard the headset.

An IR emitter power optimization system in embodiments of the present disclosure balances a need to restrict power consumed by the IR emitters with a need to gather accurate depth information for SLAM processing. In some embodiments, the IR emitter power optimization system may limit the amount of power consumed by only powering on IR emitters determined to be necessary to generate current or expected SLAM frames. This may be accomplished by powering down emitters emitting light toward areas not within the user's field of view or not likely to be within the user's field of view in the immediately expected future. In other embodiments, the IR emitter power optimization system may limit the intensity at which active IR emitters emit light based on the measured distance between that emitter and the farthest identified object reflecting light from that emitter. In these ways, embodiments of the present disclosure may optimize power consumption of the plurality of IR emitters mounted on a headset by adaptively and narrowly tailoring the intensity of light emitted by each IR emitter to that needed to generate an accurate measurement of distance to landmarks likely to fall within the field of view of the headset user.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, computer readable medium 122 storing instructions 124 of the IR emitter power optimization system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a head mounted display 118, which may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display may use any method that reflects projected images in order to create an augmented reality. Additionally, the information handling system 100 may include an input device 112, such as a keyboard, and/or a cursor control device, such as a mouse, touchpad, or gesture or touch screen input. The information handling system 100 can also include a disk drive unit 116.

The information handling system 100 may also include an infrared emitter power optimization system 132 that may be operably connected to the bus 108. The IR emitter power optimization system 132 computer readable medium 122 may also contain space for data storage. The IR emitter power optimization system 132 may perform tasks related to minimizing total power consumed by a plurality of IR emitters mounted on a wearable headset including the head mounted display 118. In an embodiment, the IR emitter power optimization system 132 may communicate with the main memory 104, the processor 102, the alpha-numeric input device 112, head mounted display 118, and the network interface device 120 via bus 108, and several forms of communication may be used, including ACPI, SMBus, a 24 MHZ BFSK-coded transmission channel, or shared memory.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 120 may also provide connectivity via Bluetooth to a nearby information handling system, such as a desktop or laptop information handling system, or to a tablet or mobile device. In some embodiments, the head mounted display 118 may be accessed via the network 128 rather than via bus 108. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The information handling system 100 can include a set of instructions 124 that can be executed to cause the computer system to perform any one or more of the methods or computer based functions disclosed herein. For example, instructions 124 may execute an IR emitter power optimization system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the IR emitter power optimization system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including a calibration look-up table. The disk drive unit 116 and static memory 106 also contain space for data storage. Further, the instructions 124 may embody one or more of the methods or logic as described herein. For example, instructions relating to the IR emitter power optimization system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the IR emitter power optimization system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The IR emitter power optimization system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2A:
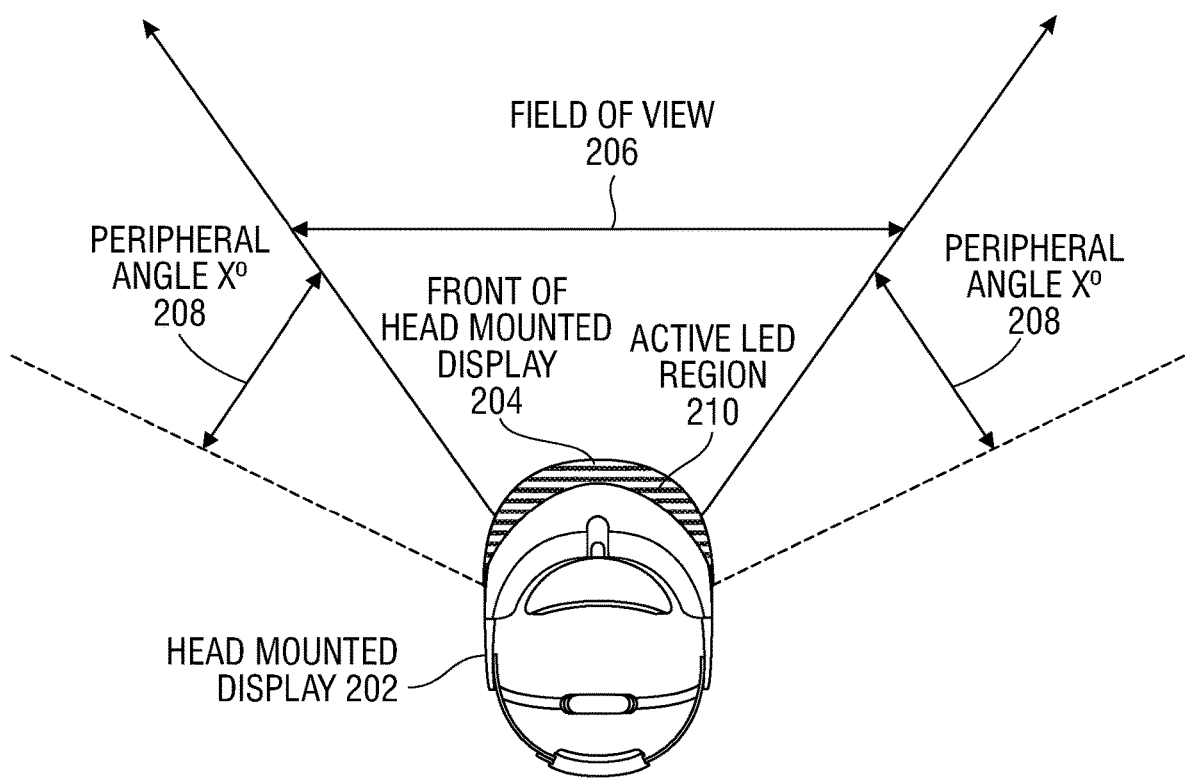
FIG. 2A is a graphical diagram illustrating a region of infrared emitters actively emitting infrared light according to an embodiment of the present disclosure.

FIG. 2A is a graphical diagram illustrating a region along the exterior of a wearable headset of infrared emitters actively emitting infrared light according to an embodiment of the present disclosure. A wearable headset 202 may include a head mounted display located in the front of the wearable headset 204, which may operate to project virtual images. Such virtual images may be projected such that they appear within the wearer's field of view 206 within a purely virtual environment (virtual reality), or such that they fit within the real-world environment (augmented reality).

A plurality of infrared emitters may be mounted along the exterior of the wearable headset 202, radiating outward toward the environment surrounding the headset 202. In one embodiment, the IR emitter power optimization system may optimize the power consumed by the IR emitters by only emitting IR light from a subset of the IR emitters. For example, the IR emitter power optimization system may instruct only the IR emitters needed to accurately depict virtual content at the current time or immediate future to emit light. Because virtual content is projected within the user's field of view 206, distance between the headset 202 and any landmarks within the field of view 206 may be needed in order to accurately depict virtual content. As such, IR emitters within the field of view 206 and within a preset angle 208 peripheral to either side of the field of view 206 may lie within a region identified as an active emitter region 210. The IR emitter power optimization system in an embodiment may instruct IR emitters within the active region 210 to emit light, while simultaneously deactivating IR emitters not within the active region 210 to power down, thus limiting the total power consumed by the plurality of IR emitters mounted on the headset 202.

Figure 2B:
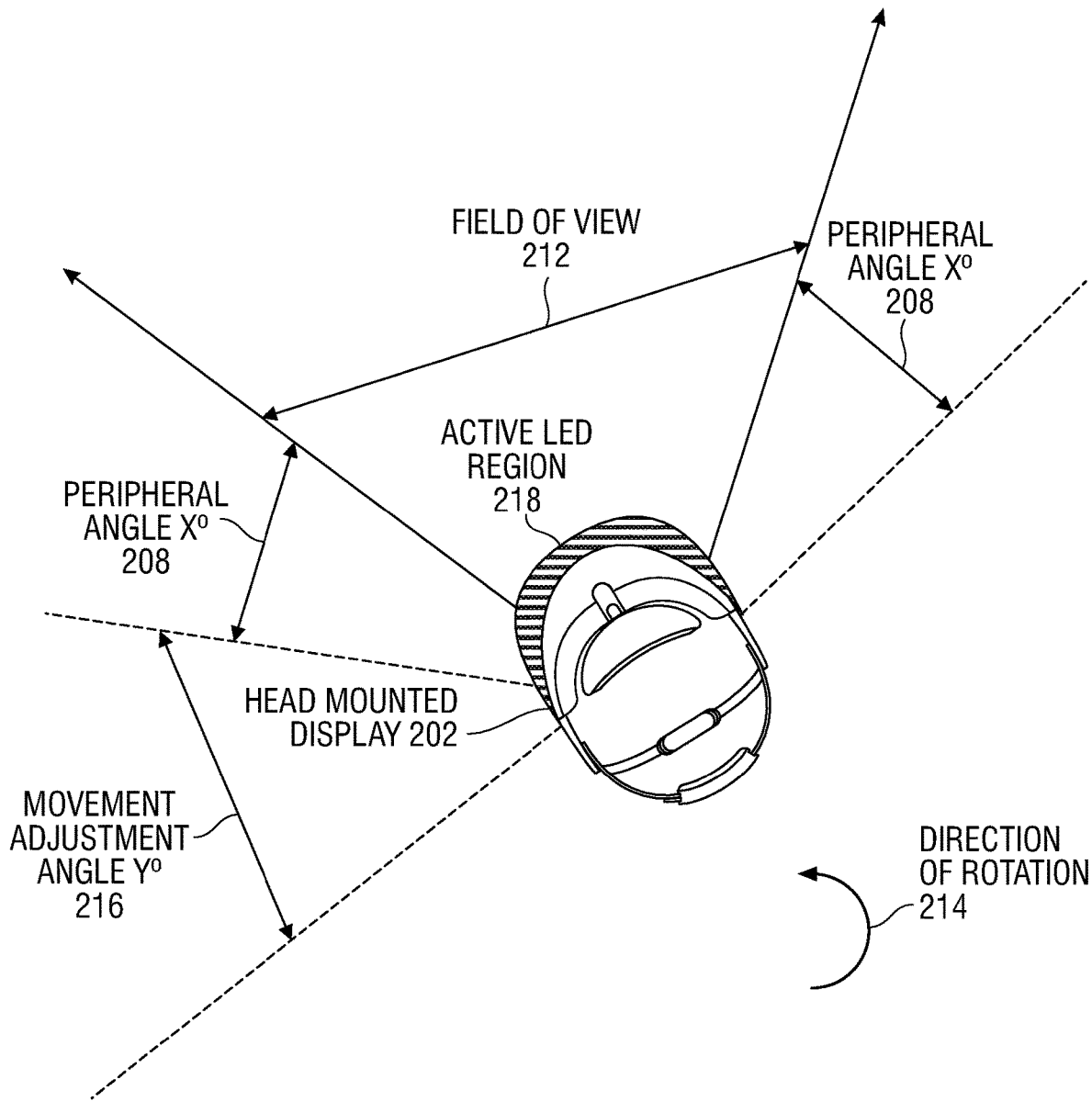
FIG. 2B is a graphical diagram illustrating a region of infrared emitters actively emitting infrared light during rotation of the headset according to an embodiment of the present disclosure.

FIG. 2B is a graphical diagram illustrating a region along the exterior of a wearable headset 202 of infrared emitters actively emitting infrared light during rotation of the headset according to an embodiment of the present disclosure. As described herein, the IR emitter power optimization system may instruct only the IR emitters needed to accurately depict virtual content at the current time or immediate future to emit light. In the embodiment shown in FIG. 2B, the wearable headset 202 may be undergoing a counterclockwise rotation 214. Such a rotation may also cause a rotation in the field of view to the field of view 212. Detected rotation of the headset 202 may indicate the user will continue to turn counterclockwise in the near future, prompting an imminent need to accurately project virtual content outside the field of view 212 toward the direction of rotation 214. Consequently, the IR power optimization system in an embodiment may expand the active emitter region 218 to include IR emitters capable of emitting light within a preset movement adjustment angle 216 radiating outward from the field of view 212 and peripheral angle 208 in the direction of rotation 214.

Figure 2C:
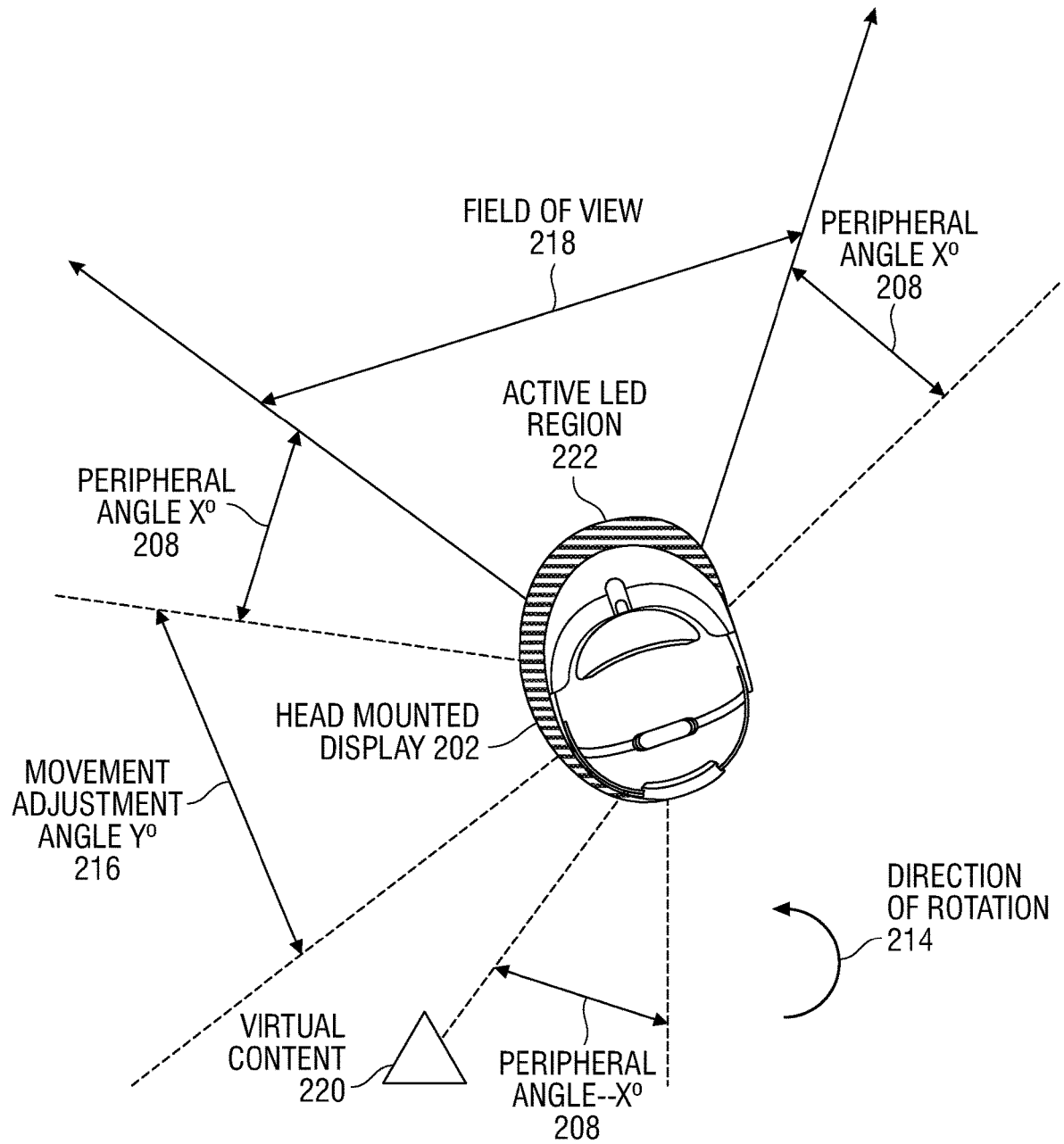
FIG. 2C is a graphical diagram illustrating a region of infrared emitters actively emitting infrared light in the direction of a virtual object according to an embodiment of the present disclosure.

FIG. 2C is a graphical diagram illustrating a region along the exterior of a wearable headset 202 of infrared emitters actively emitting infrared light in the direction of a virtual object according to an embodiment of the present disclosure. It may be determined in an embodiment that a virtual image 220 is likely to be projected within the wearable headset 202 in the immediate future. In such an embodiment, it may be important to accurately determine the distance between the headset 202 and any landmarks in the area where the virtual content 220 will be displayed. Thus, the IR power optimization system in such an embodiment may further expand the active emitter region 222 from the field of view 212 and peripheral angle X 208 beyond a preset movement adjustment angle 216 radiating outward from the field of view 212 to include IR emitters capable of emitting light toward the area in which the virtual content 220 will be projected. For example, the active emitter region 222 in an embodiment may expand to include a preset peripheral angle 208 extending from either side of the bearing to the virtual content 220.

Figure 3:
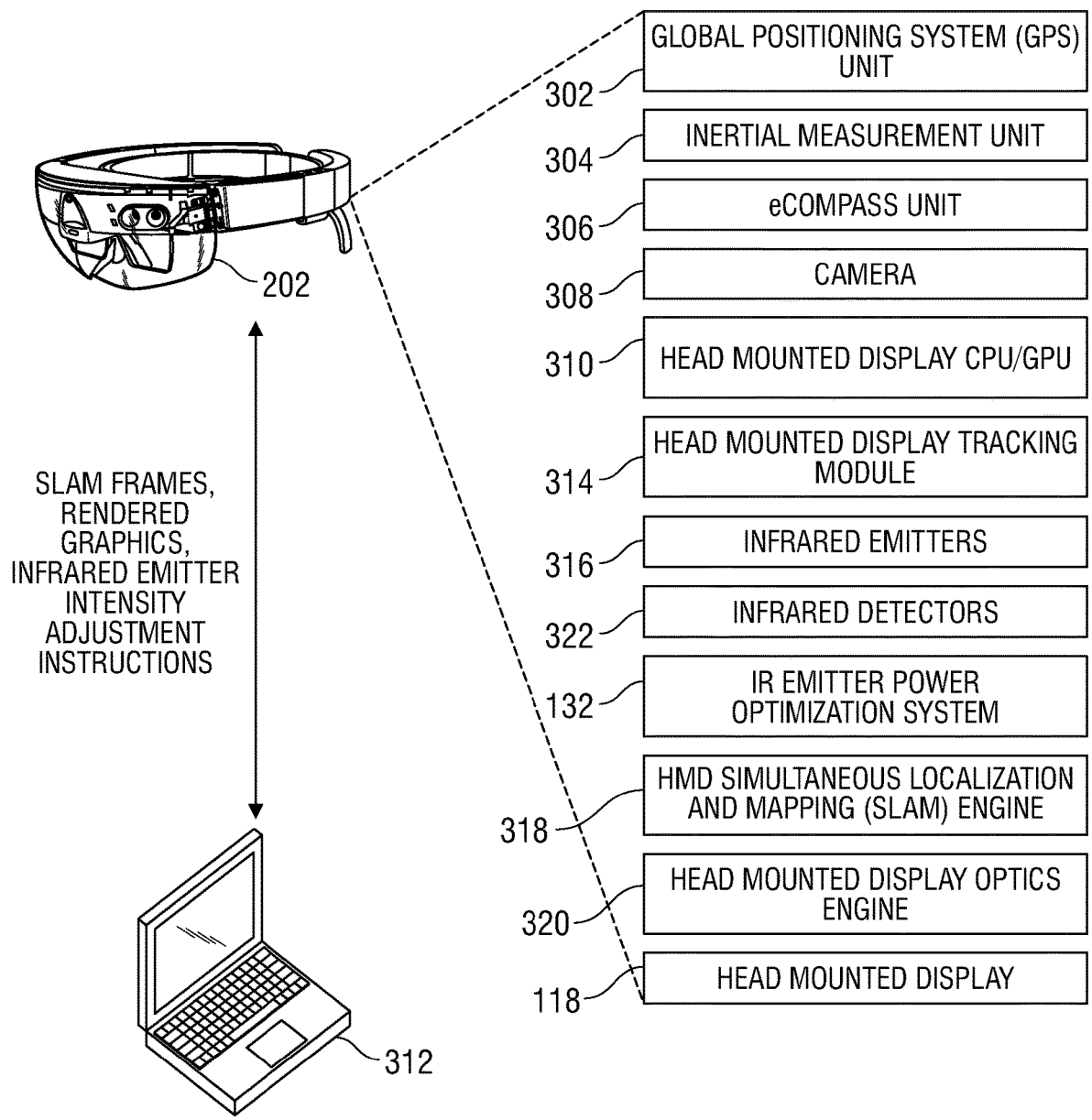
FIG. 3 is a block diagram illustrating components of a head mounted display headset according to an embodiment of the present disclosure.

FIG. 3 is a block diagram illustrating components of a head mounted display headset incorporating an IR emitter power optimization system according to an embodiment of the present disclosure. In an embodiment, one or more subsystems within a head mounted display information handling system 202 may execute code instructions of the IR emitter power optimization system, or may operate in tandem with the IR emitter power optimization system.

The head mounted display information handling system 202 in an embodiment may include subsystems for measurement of its position and/or orientation. For example, the head mounted display information handling system 202 in an embodiment may include positional sensors such as a global positioning system (GPS) unit 302, an inertial measurement unit (IMU) 304, an e-Compass unit 306, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, a grating sensor, an inductive non-contact position sensor, a linear variable differential transformer, a photodiode array, a piezo-electric transducer, a proximity sensor, a rotary encoder, a seismic displacement pick-up, and a string potentiometer, along with any other positional sensors developed in the future. The positional sensors (e.g. GPS unit 302, IMU 304, and/or eCompass unit 306) in an embodiment may operate to measure location coordinates (x, y, z) of the head mounted display information handling system 202, as well as orientation (θ), velocity, and/or acceleration. Velocity, acceleration, and trajectory of the head mounted display information handling system 202 in such an embodiment may be determined by comparing a plurality of measured location coordinates and orientations taken over a known period of time, or may be measured directly by onboard positional sensor such as an accelerometer.

The head mounted display information handling system 202 may also be capable of capturing video or still images of its surrounding environment, which may include one or more identifiable landmarks. For example, the head mounted display information handling system 202 may include a head mounted display camera 308. The camera 308 may capture a two dimensional image of the surrounding environment, which may be combined with distance measurements gathered by a plurality of IR emitters and detectors to generate a three-dimensional image of the surrounding environment. The head mounted display camera 308 in an embodiment may be, for example, a stereo triangulation camera, a sheet of light triangulation camera, a structured light camera, a time-of-flight camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image captured by the head mounted display three-dimensional camera 308 in an embodiment may be used to determine the position and orientation of the head mounted display with respect to the one or more landmarks.

The head mounted display information handling system 202 in an embodiment may further include a head mounted display CPU 310, which may execute instructions of the IR emitter power optimization system 132. Such instructions executed by the head mounted display CPU 310 in an embodiment may include writing IR emitter intensity adjustment instructions for one or more infrared emitters to infrared emitter firmware controlling the power draw limits for each of the plurality of infrared emitters. The IR emitter intensity adjustment instructions in such an embodiment may be generated by the IR emitter power optimization system 132 operating onboard the head mounted display information handling system 202. In another embodiment, the IR emitter intensity adjustment instructions may be generated by the host laptop/desktop information handling system 312 and transmitted to the head mounted display information handling system 202 via a network adapter.

The head mounted display CPU 310 may also transmit an image of the surrounding environment captured by the three-dimensional camera 308, the measured position (x, y, z), orientation (θ), velocity, and/or acceleration of the head mounted display information handling system 202 to the wirelessly connected laptop or desktop information handling system 312 via a network adapter in an embodiment. The CPU 310 may also receive SLAM frames indicating the positions of the head mounted display information handling system 202 and one or more identified landmarks in the surrounding environment from the remotely connected laptop or desktop information handling system 312 via the network adapter.

In other embodiments, the processor 310 may be a graphics processing unit (GPU). The GPU 310 in an such an embodiment may determine the position/orientation of identified landmarks with respect to the head mounted display information handling system 202 through analysis of the positional information measured in the image captured by the three-dimensional camera 308 in combination with an identification by the head mounted display tracking module 314 of the one or more landmarks. In some embodiments, such positional/orientation information may be received at the CPU/GPU 310 from the remotely located laptop or desktop information handling system 312 via a network adapter.

The head mounted display information handling system 202 in an embodiment may further include one or more subsystems capable of identifying one or more landmarks within three-dimensional image information. For example, the head mounted display information handling system 202 may include a head mounted display tracking module 314. The head mounted display tracking module 314 in an embodiment may access the three-dimensional image information of one or more nearby landmarks captured by the head mounted display three-dimensional camera 308. In some embodiments, the tracking module 314 may identify the physical boundaries of one or more potential landmarks within the three-dimensional image captured by the head mounted display three-dimensional camera 308. Once the physical boundaries of the landmarks are identified by the tracking module 314 in an embodiment, the distance between these identified items and the head mounted display 202 may be determined.

A plurality of infrared emitters 316 may be mounted along the exterior of the head mounted display information handling system 202 in an embodiment. Each infrared emitter 316 (e.g. an infrared light emitting diode) in an embodiment may operate to emit infrared light toward the environment surrounding the head mounted display information handling system 202. In some embodiments, the light emitted from each emitter 316 may be patterned, and each emitter may emit the same pattern, or different emitters may emit different patterns. The intensity of light emitted from each emitter 316 in an embodiment may be controlled by the CPU 310, a controller (not shown), or an integrated circuit or chip (not shown) executing firmware instructions of the emitter 316. Such firmware may also identify the position of each emitter 316 along the exterior of the head mounted display information handling system 202 (e.g. position with respect to field of view of headset).

The head mounted display information handling system 202 may further include one or more infrared detectors 322 capable of detecting infrared light emitted from the plurality of infrared emitters 316 reflecting off the surfaces of landmarks or objects within the environment surrounding the head mounted display information handling system 202. IR detectors 322 in an embodiment may be composed of pyro-electric materials capable of generating an electrical current based on received or detected heat. Electrical currents generated by the plurality of IR detectors 322 in an embodiment may be used to determine a length of time during which light emitted from an IR emitter 316 traveled toward an object in the environment surrounding the headset 202, then traveled back toward the infrared detector 322 upon reflection. This travel time may then be used to determine a distance between the headset 202 and the reflecting object or landmark.

The head mounted display information handling system 202 may further include one or more subsystems capable of mapping the positions/orientations of the head mounted display information handling system 202 and one or more identified landmarks within a virtual three-dimensional environment in an embodiment. For example, the head mounted display information handling system 202 may include a head mounted display (HMD) simultaneous localization and mapping (SLAM) engine 318. The HMD SLAM engine 318 in an embodiment may access the position/orientation information for the one or more landmarks with respect to the head mounted display information handling system 202 generated or received by the CPU/GPU 310, and use this information to generate a three-dimensional virtual map of the head mounted display information handling system 202 and its surrounding environment, including the one or more identified landmarks. In other embodiments, the CPU/GPU 310 may receive one or more SLAM frames including three-dimensional virtual maps of the head mounted display information handling system 202 and its surrounding environment from the remotely located laptop or desktop information handling system 312 via a network adapter.

In an embodiment, one or more subsystems capable of rendering an image of the surrounding environment from the perspective of the head mounted display information handling system 202 may also be included onboard the head mounted display information handling system 202. For example, the head mounted display information handling system 202 may include a head mounted display optics engine 320, which may access the three-dimensional virtual map generated by the HMD SLAM engine 318 or received from the remotely located information handling system 312 in an embodiment. The head mounted display optics engine 320 in an embodiment may render a three-dimensional image of the surrounding environment including the identified one or more landmarks based on the location/orientation of the landmarks with respect to the head mounted display information handling system 202 within the virtual map, as with a virtual reality environment. In other embodiments, the head mounted display optics engine 320 may render a three-dimensional image of an object projected to appear as if it is incorporated within the environment surrounding the head mounted display information handling system 202, as with an augmented reality environment.

The head mounted display information handling system 202 in an embodiment may further include one or more subsystems capable of and displaying the rendered image of the surrounding environment within the head mounted display information handling system. For example, the head mounted display information handling system 202 may include a head mounted display 118, capable of displaying the image (e.g. virtual reality image, or augmented reality image) rendered by the head mounted display optics engine 320.

Figure 4:
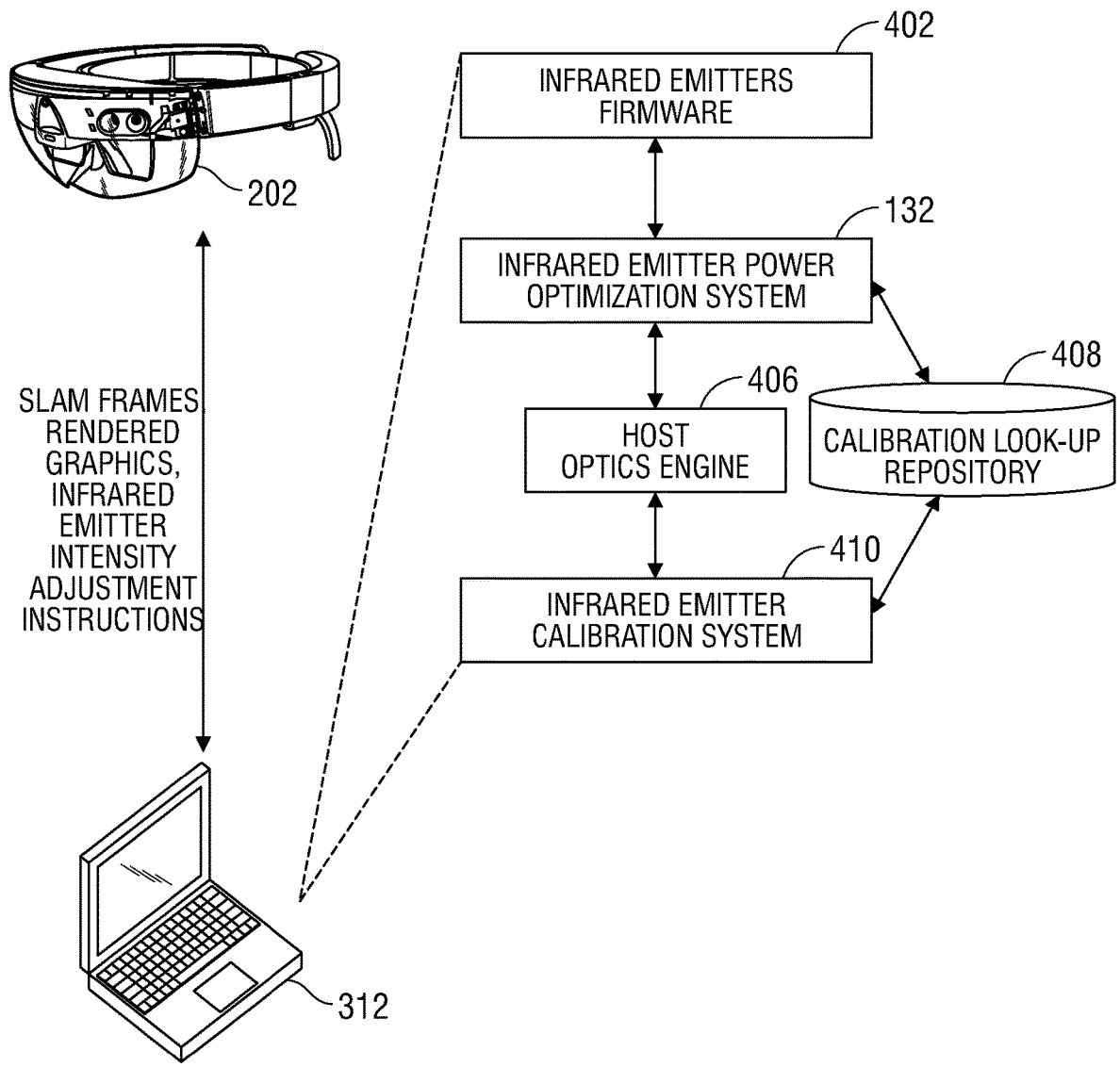
FIG. 4 is a block diagram illustrating components of a host information handling system connected to a head mounted display headset according to an embodiment of the present disclosure.

FIG. 4 is a block diagram illustrating components of a host information handling system incorporating a calibration look-up repository connected to a head mounted display headset according to an embodiment of the present disclosure. The information handling system 312 in some embodiments may be located remotely from and in wireless communication with the head mounted display information handling system 202. In other embodiments, the host information handling system 312 may be operably connected to the head mounted display information handling system 202 via a single cord (e.g. USB-C). For example, the information handling system 312 may receive SLAM frames generated by the head mounted display information handling system 202, and may transmit rendered graphics, and infrared emitter intensity adjustment instructions to the head mounted display information handling system 202.

The host information handling system 312 in an embodiment may include infrared emitter firmware 402 operating to control power supplied to each of a plurality of infrared emitters mounted upon the head mounted display information handling system 202. Such firmware 402 may include individual instructions for each of the plurality of infrared emitters to operate according to an on state, or an off state in an embodiment. Firmware 402 and an infrared emitter driver may control emitter intensity values. The firmware 402 may also instruct each emitter to emit light according to a capped intensity value in order to limit the amount of power supplied to each emitter.

An infrared emitter power optimization system 132 may also operate fully or partially onboard the host information handling system 312 in an embodiment. The infrared emitter power optimization system 132 in an embodiment may operate to determine an on/off state for each infrared emitter based on the field of view and/or rotation of the head mounted display information handling system 202, and/or based on the location of a virtual object likely to be displayed in the near future with respect to the head mounted display information handling system 202. Instructions for the operation of one or more IR emitters may be generated based on these determinations and written to the firmware 402 in an embodiment. In other embodiments, such instructions may be transmitted from the host information handling system 312 to the head mounted display information handling system 202 to be written to firmware located onboard the head mounted display information handling system 202. In still other embodiments, both the infrared emitter power optimization system 132 and the infrared emitters firmware 402 may operate completely onboard the head mounted display information handling system 202 and the CPU of the head mounted display information handling system may operate to write the instructions determined by the infrared emitter power optimization system 132 to the firmware 402.

In an embodiment, one or more subsystems capable of rendering an image of the surrounding environment from the perspective of the head mounted display information handling system 202 may also be included onboard the host information handling system 312. For example, the host information handling system 312 may include a host optics engine 406, which may render a three-dimensional image based on a SLAM frame received from the head mounted display information handling system 202. Such rendered graphics may then be transmitted back for display within the head mounted display information handling system 202 in an embodiment.

The host information handling system 312 in an embodiment may further include an infrared emitter calibration system 410, which may read and write information to and from a calibration look-up repository 408, which may be stored in a memory. For example, for each infrared emitter onboard the head mounted display information handling system 202 in an embodiment, the infrared emitter calibration system 410 may determine an intensity value of light emitted from the IR emitter during a calibration process, and a distance measured between the IR emitter and a farthest identified object in the environment surrounding the head mounted display information handling system 202. The infrared emitter calibration system 410 in such an embodiment may then store such information in a table within the calibration look-up repository 408 which associates each infrared emitter with the measured distance to the farthest object identified, the intensity of light emitted during calibration. The infrared emitter power optimization system 132 in an embodiment may also read/write to/from the calibration look-up repository 408 in an embodiment. For example, the infrared emitter power optimization system 132 may further associate each IR emitter in the table with an intensity cap value, and/or with a current power status (e.g. on or off).

Figure 5:
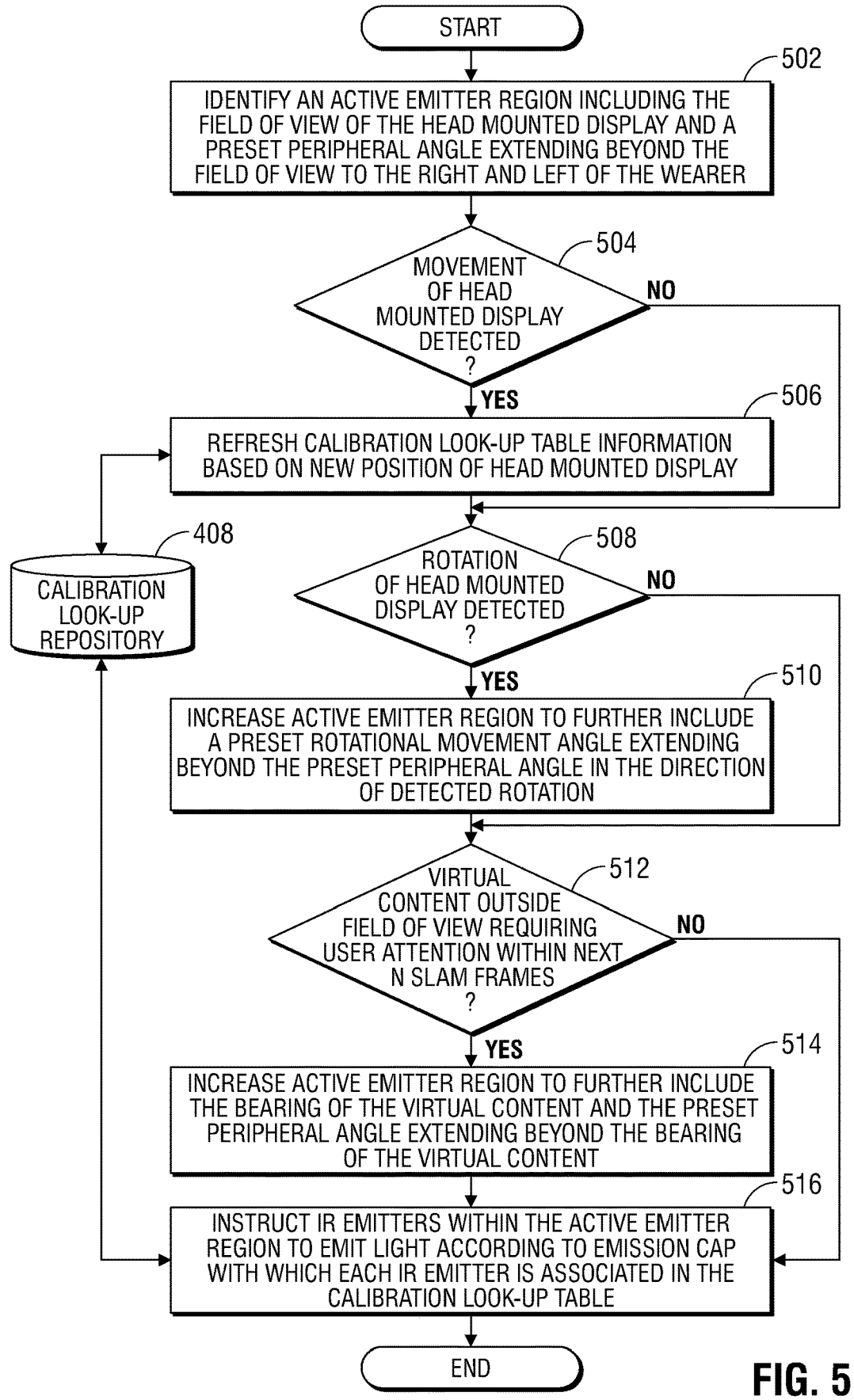
FIG. 5 is a flow diagram illustrating a process of instructing only IR emitters within a determined active emitter region to emit light according to an embodiment of the present disclosure.

FIG. 5 is a flow diagram illustrating a process of limiting power consumed by a plurality of IR emitters mounted on a wearable headset by instructing only IR emitters within a determined active emitter region to emit light according to an embodiment of the present disclosure. An IR emitter power optimization system in an embodiment may adaptively optimize the intensity of light emitted from the plurality of infrared emitters mounted on the headset, and thus the power consumed thereby. In such a way, the power consumed by these infrared emitters in some embodiments of the present disclosure may be decreased such that a battery housed within the headset may provide all necessary power, and the headset may be completely untethered. In other embodiments of the present disclosure, the power consumed by these infrared emitters such that the total power required by the headset falls below a power draw requirement associated with the Universal Serial Bus Type-C (USB-C) power draw requirements. In such embodiments, the headset may then be tethered to a laptop or desktop via a single USB-C cord.

Optimizing intensity of light emitted from the plurality of infrared emitters may involve determining a minimum number of infrared (IR) emitters that may emit light while successfully executing SLAM processing. A SLAM process may involve real-time processing of the current location of a headset within a surrounding environment and simultaneous predictive processing of a future position of the headset. Embodiments of the present disclosure may use an inside-out localization process to determine the position of a head mounted display from one or more landmarks identified within a three-dimensional image of such landmarks. Distance between the head mounted display and each landmark in embodiments of the present disclosure may be determined via the use of the plurality of IR emitters mounted on the headset. For example, an IR emitter may emit IR light at a given intensity toward a landmark, and the distance between the IR emitter and the landmark may be determined by analyzing the way in which the IR light reflected off the landmark, back toward an IR sensor onboard the headset. In order to conserve power, the IR emitter power optimization system in an embodiment may instruct only IR emitters needed to determine a distance between the headset and one or more landmarks likely to be used in generating three-dimensional images for projection within the headset to emit light. The method of FIG. 5 may be used in order to determine which IR emitters are needed in order to successfully execute SLAM processing based on current environmental factors and state measurements for the headset.

At block 502, the IR emitter power optimization system in an embodiment may identify an active emitter region including the field of view of the head mounted display and a preset peripheral angle extending beyond the field of view to the right and left of the wearer. As described in an embodiment with reference to FIG. 2A, distance between the headset 202 and any landmarks within the field of view 206 may be needed in order to accurately depict virtual content, because virtual content is projected within the user's field of view 206. As such, IR emitters within the field of view 206 and within a preset angle 208 peripheral to either side of the field of view 206 may lie within a region identified as an active emitter region 210.

The IR emitter power optimization system may determine whether movement of the head mounted display has been detected at block 504 in an embodiment. In an embodiment described with reference to FIG. 3, such movement may include a change in position (x, y, z) of the headset, as measured by the GPS unit 302, the IMU 304, or the eCompass Unit 306. If movement is detected at block 504 in an embodiment, the active emitter region may need to increase in scope, and the method may proceed to block 506. If movement is not detected at block 506, the method may proceed to block 508 to determine if other factors warrant broadening the region of active emitters.

In an embodiment in which movement is detected, the IR emitter power optimization system may refresh the calibration look-up table information based on the new position of the head mounted display at block 506. The calibration look-up table in an embodiment may associate an IR emitter with a measured distance between that IR emitter and the farthest identified object from that emitter. If the headset and that IR undergo movement, as determined at block 504, the measured distance between that IR and the farthest identified object from that emitter may also change. For example, the object may become closer or farther away than it was prior to the detected movement, or another object may become the farthest identified object from that emitter as a result of the detected movement. In such an embodiment, the distance between the IR emitter and the farthest identified object may be re-measured and the updated measurement may then be associated with that IR emitter within the calibration look-up table stored at the calibration look-up repository 408.

At block 508, the IR emitter power optimization system in an embodiment may determine whether rotation of the head mounted display has been detected. Such rotation in an embodiment may be measured by the IMU 304 or eCompass Unit 306. For example, in an embodiment described with reference to FIG. 2B, the wearable headset 202 may be undergoing a counterclockwise rotation 214. If rotation is detected in an embodiment, this may indicate the user will continue to turn counterclockwise in the near future, and the method may proceed to block 510. If rotation is not detected, the method may proceed to block 512 to determine if other factors warrant broadening the region of active emitters.

The IR emitter power optimization system in an embodiment may increase the active emitter region to further include a preset rotational movement angle extending beyond the preset peripheral angle in the direction of detected rotation at block 510. If rotation is detected at block 508 in an embodiment, this may indicate the user will continue to turn counterclockwise in the near future. Such an anticipated future rotation may also prompt an imminent need to accurately project virtual content outside the field of view 212 toward the direction of rotation 214, as the user continues to rotate in that direction. Consequently, the IR power optimization system in an embodiment may expand the active emitter region 218 to include IR emitters capable of emitting light within a preset movement adjustment angle 216 radiating outward from the field of view 212 and peripheral angle 208 in the direction of rotation 214. In such a way, emitters capable of determining distances to landmarks needed to generate display graphics in the very near future may be activated in anticipation of that need.

At block 512, the IR emitter power optimization system in an embodiment may determine whether virtual content outside the field of view will require user attention within the next N SLAM frames generated to represent future placement of the headset within its surrounding environment. It will be understood that any number of anticipated SLAM frames, such as anywhere from 10-50 anticipated SLAM frames, may be used in various embodiments. For example, it may be determined in an embodiment described with reference to FIG. 2C that a virtual image 220 is likely to be projected within the wearable headset 202 in the immediate future. In such an embodiment, it may be important to accurately determine the distance between the headset 202 and any landmarks in the area where the virtual content 220 will be displayed, and the method may proceed to block 514. If rendering of virtual content outside the field of view is not anticipated to occur in the next N SLAM frames (or other number of anticipated SLAM frames), the active emitter region may be sufficiently broad to successfully complete the SLAM process, and the method may proceed to block 516.

In an embodiment in which virtual content outside the field of view will likely require the user's attention within the next N SLAM frames (or other number of anticipated SLAM frames), the IR emitter power optimization system may increase the active emitter region to further include emitters within a preset peripheral angle measured outward in both horizontal directions from the bearing of the virtual content. For example, the IR power optimization system in an embodiment where virtual content 220 will be projected in the near future may further expand the active emitter region 222 to include IR emitters capable of emitting light toward the area in which the virtual content 220 will be projected. In such an embodiment, the active emitter region 222 in an embodiment may expand to include a preset peripheral angle 208 extending from either side of the bearing to the virtual content 220.

Once the IR emitter power optimization system in an embodiment determines an active emitter region at blocks 502, 510, and/or 512, the system may instruct IR emitters within the active emitter region to emit light according to an emission cap with which each IR emitter is associated in the calibration look-up table. For example, the IR emitter power optimization system in an embodiment may access a look-up table stored in the calibration look-up repository 408 in order to set the power status of all IR emitters within the active emitter region to an ON state, while setting the power status of all IR emitters outside the active emitter region to an OFF state. Those IR emitters associated with an ON state may limit the intensity of light emitted to an emission cap value also associated with each IR emitter within the look-up table to further limit the power consumed by the plurality of IR emitters. A method for determining such an emission cap is described in greater detail with reference to FIG. 6. The method may then end. In such a way, an IR emitter power optimization system in embodiments of the present disclosure balances a need to restrict power consumed by the IR emitters with a need to gather accurate depth information for SLAM processing.

Figure 6:
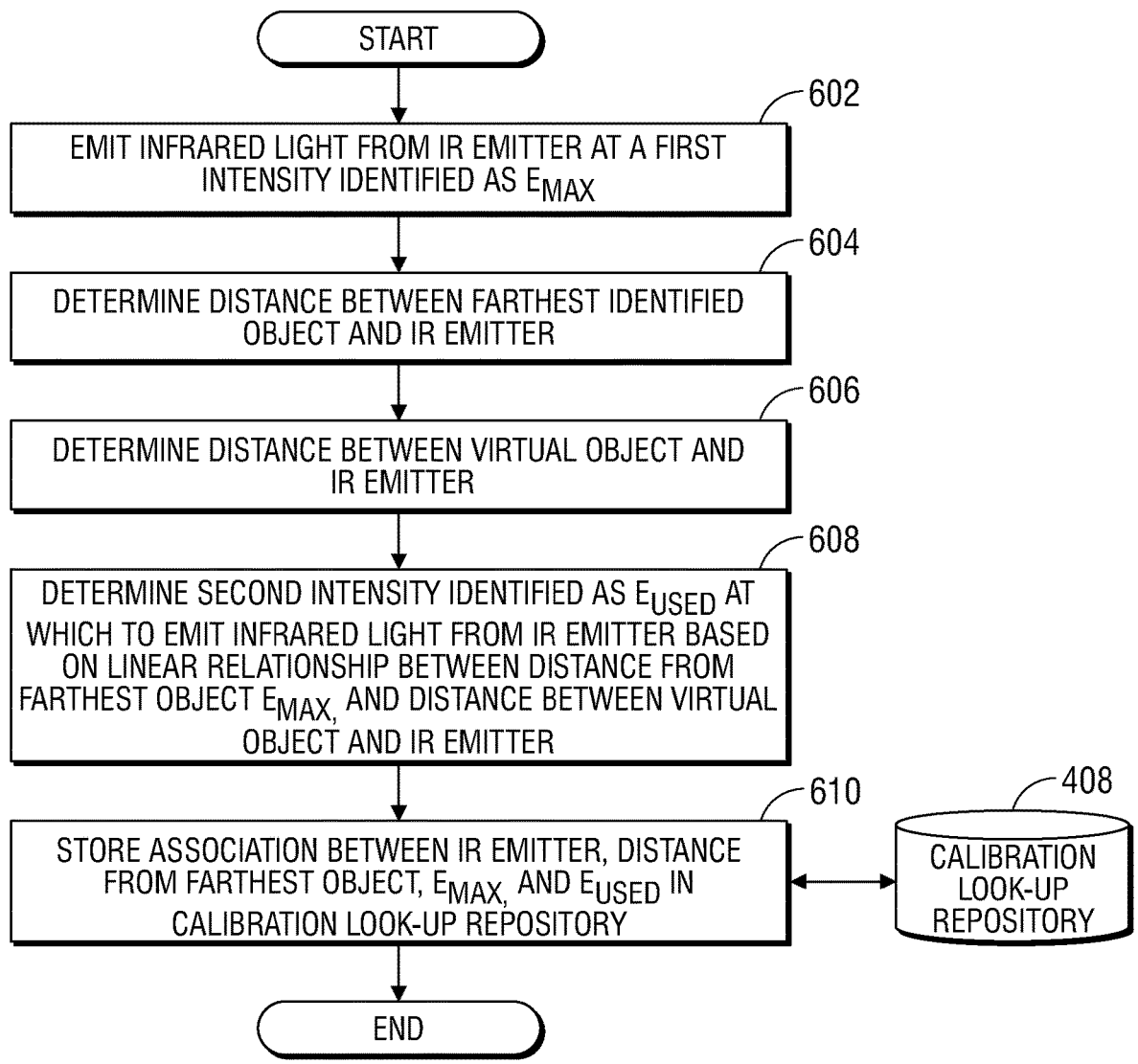
FIG. 6 is a flow diagram illustrating a method of determining emission cap values for a plurality of IR emitters according to an embodiment of the present disclosure.

FIG. 6 is a flow diagram illustrating a method of determining emission cap values for a plurality of IR emitters according to an embodiment of the present disclosure. As described herein, optimizing intensity of light emitted from the plurality of infrared emitters in embodiments of the present disclosure may involve determining a minimum intensity at which one of more infrared (IR) emitters may emit light while successfully executing SLAM processing. The IR emitter power optimization system may limit the intensity at which active IR emitters emit light based on the measured distance between that emitter and the farthest identified object reflecting light from that emitter. In order to do so, the IR emitter power optimization system in an embodiment may first determine the minimum intensity at which each IR emitter may emit light sufficient to map a region in which a virtual object will be projected. Such a determination may involve performing one or more measurements during a calibration phase, prior to the start of a user session where virtual objects may be displayed within the wearable headset.

During a calibration phase, at block 602, infrared light may be emitted in an embodiment from an IR emitter at a calibration intensity. In such an embodiment, an identification of the IR emitter, as well as the calibration intensity at which light is being emitted during calibration may be stored in a look-up table. Table 1, shown below, illustrates an example look-up table in an embodiment.

TABLE 1

| IR Emitter ID | Distance from farthest object | Calibration Intensity (cd) | Emission Cap Value (cd) | Power Status |
|---|---|---|---|---|
| 1 | 3 meters | $E_{MAX} = 0.7$ | $E_{CAP} = 0.35$ | OFF |
| 2 | 1 meter | $E_{MAX} = 0.4$ | $E_{CAP} = 0.4$ | ON |
| 3 | 2 meters | $E_{MAX} = 0.6$ | $E_{CAP} = 0.45$ | ON |
| ... | ... | ... | ... | ... |
| M | 1 meter | $E_{MAX} = 0.4$ | $E_{CAP} = 0.4$ | OFF |

The calibration look-up table in an embodiment may associate a plurality of IR emitters, numbered one through M, with a distance from a farthest identified object, a calibration intensity, an emission cap value, and a power status. The calibration intensities listed in the middle column of Table 1 may be given in candelas (cd). For example, as shown in the first row from the top of Table 1, the IR emitter power optimization system in an embodiment may associate IR emitter No. 1 with the intensity ($E_{MAX}$) of 0.7 candelas (cd), at which it emits light during a calibration phase. In such an embodiment, as shown in the third, fourth, and sixth rows from the top of Table 1, the IR emitter power optimization system may simultaneously associate IR emitter No. 2 with the $E_{MAX}$ of 0.4 cd, IR emitter No. 3 with the $E_{MAX}$ of 0.6 cd, and an $M^{th}$ IR emitter with the $E_{MAX}$ of 0.4 cd at which each of emitters two through M emits light during the calibration phase.

At block 604, the IR emitter power optimization system in an embodiment may determine a distance between a farthest identified object and an IR emitter emitting light toward it. For example, in an embodiment described with reference to FIG. 3, the camera 308 may capture an image including a plurality of objects in the environment immediately surrounding the head mounted display information handling system 202. Distances between the head mounted display information handling system 202 and the one or more objects may be determined based on infrared light emitted toward the objects and reflected back toward infrared detectors 322. Such distance measurements may then be combined with the image captured by camera 308 in order to generate a three-dimensional image or primitives of the one or more objects. The head mounted display tracking module 314 in such an embodiment may then identify one or more objects within the three-dimensional image. The HMD SLAM engine 318 may then identify the distances between each identified object and the head mounted display information handling system 202 given in the three-dimensional image in order to identify which of the objects is located farthest away from the head mounted display information handling system 202 and the measured distance between the two.

Such information may then be entered into the look-up table, as shown in Table 1, above. For example, the IR emitter power optimization system in an embodiment may associate IR emitter No. 1 with a distance of three meters from the farthest object identified in the three-dimensional image generated, in part, based on the reflected infrared light emitted from IR emitter No. 1. In such an embodiment, as shown in the third, fourth, and sixth rows from the top of Table 1, the IR emitter power optimization system may simultaneously associate IR emitter No. 2 with a distance of one meter, IR emitter No. 3 with a distance of two meters, and IR emitter M with a distance of one meter between each of emitters two, three, and M, respectively, and the objects identified as being farthest from those emitters. The object identified as farthest from one emitter may differ from or be the same as the object identified as farthest from another emitter. For example, the object located three meters from emitter No. 1 may not be the same as the object located two meters from emitter No. 3. As another example, the object located one meter from emitter No. 2 may be the same object located one meter from emitter No. 5. By identifying the farthest object from the head mounted display information handling system in an embodiment, the maximum distance an infrared light may need to travel in order to successfully map the surrounding environment may be determined.

The IR emitter power optimization system in an embodiment may determine a distance between a virtual object and an IR emitter at block 606. The distance between the virtual object and the IR emitter may determine the range at which light from the IR emitter may need to be reflected in order to gather distance measurements used to generate an accurate SLAM frame or rendered image in an embodiment. In other words, it is not necessary to determine the distance between the headset and all surrounding landmarks or objects in an embodiment. Rather, only distances between the headset and objects or landmarks in the surrounding environment at the location where a virtual image is to be displayed may be required in order to generate accurate rendered images. Thus, the distance at which the virtual object is to be displayed defines the maximum distance light may need to travel from an IR emitter toward an object or landmark in the surrounding environment, then back to the IR detector in an embodiment. In such a way, the IR emitter power optimization system in an embodiment may determine a virtual object will be displayed in an area located 1.5 meters from IR emitters 1 and 3, one meter from IR emitters 2 and 5. In some embodiments, the IR emitter power optimization system may determine a distance between an IR emitter and the position a virtual object will have in the future at block 606. Such a determination may be made based on SLAM frames predicted to be needed in the near future (e.g. within N frames).

At block 608, a second intensity at which light may be emitted from an IR emitter in order to travel the distance determined at block 606 may be determined in an embodiment. The measured distance between a given IR emitter and the intensity at which that IR emitted light used to measure that distance may share a linear relationship, in an embodiment. Thus, if it is determined by reference to Table 1 that light emitted from IR emitter No. 1 at an intensity of 0.7 successfully traveled to and from a farthest object lying three meters from IR emitter No. 1, it may also be determined that a maximum of 0.35 candelas intensity would be required to successfully detect reflected IR light from an object located 1.5 meters from IR emitter No. 1, using the below formula:

$$\frac{\text{Intensity Cap Value}}{1.5 \text{ meters}} = \frac{0.7 \text{ candelas}}{3 \text{ meters}} \quad (1)$$

A similar approach may be used to determine a maximum intensity of 0.4 candelas may be needed to successfully detect reflected light from the area surrounding the virtual object located one meter from IR emitter No. 2. In another example, it may be determined a maximum intensity of 0.45 candelas may be needed to successfully detect reflected light from the area around the virtual object located 1.5 meters from IR emitter No. 3. In yet another example, it may be determined a maximum intensity of 0.4 candelas may be needed to successfully detect reflected light from the area around the virtual object located one meter from IR emitter No. 5. The method of FIG. 6 may be used to determine the intensity cap value ($E_{USED}$) for each IR emitter housed within the head mounted display information handling system in an embodiment. In other embodiments, the IR emitter power optimization may determine the intensity cap value for only IR emitters set to an ON state, as described by the far-right hand column of the look-up table illustrated by Table 1.

In addition to associating identifications of IR emitters in the first column on the left of Table 1 with a distance from a farthest identified object in the second column from the left, the calibration intensity ($E_{MAX}$) given in the middle column, and the intensity cap value ($E_{USED}$) given in the fourth column from the left, the look-up table stored in the calibration look-up repository 408 in an embodiment may further associate each of the IR emitters with a power status. For example, as shown in the far right column of Table 1, IR emitter Nos. 2-4 may have been placed in an ON state, while IR emitter Nos. 1 and 5 are placed in an OFF state. Such ON/OFF power status in an embodiment may be set by the IR emitter power optimization system. For example, the IR emitter power optimization system may determine whether a given emitter should be placed in an ON or OFF state based a determination of whether the emitter lies within the active emitter region defined through the method of FIG. 5.

The IR emitter power optimization system in an embodiment may store the association between the IR emitter, the distance from the farthest object, the calibration intensity ($E_{MAX}$), and the intensity cap value ($E_{USED}$) in a calibration look-up repository at block 610. The calibration look-up repository 408 may, for example, store the look-up table illustrated by Table 1, above. The look-up table may then be accessed by the IR emitter power optimization system to determine whether to instruct a given IR emitter to emit light (e.g. be placed in an ON state), as well as to determine a cap or limit for the intensity of light emitted by such IR emitters. Once such state and cap information is determined in an embodiment, the method of FIG. 6 may end. The IR emitter optimization system in an embodiment may then generate code instructions controlling the state and light intensity of each IR sensor, for execution within the firmware of the IR emitters. In such a way, an IR emitter power optimization system in embodiments of the present disclosure balances a need to restrict power consumed by the IR emitters with a need to gather accurate depth information for SLAM processing.

The blocks of the flow diagrams of FIGS. 5-6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wearable headset information handling system infrared emitter power optimization system comprising:
a memory storing an association between each of a plurality of infrared (IR) light emitters mounted to a wearable headset information handling system and a calibration intensity at which an associated one of the plurality of IR light emitters emits light while a calibration simultaneous localization and mapping (SLAM) frame is generated;
a SLAM engine generating a first session SLAM frame;
a positional sensor to determine position and detect movement of the wearable headset information handling system;
a processor identifying an active IR light emitter from the plurality of infrared light emitters based on a position of the active IR light emitter with respect to a field of view and detected movement of the wearable headset information handling system;
a SLAM engine determining a calibration distance between the active IR light emitter and a first farthest identified object based on the calibration SLAM frame, and determining an image projection distance between the active IR light emitter and a nearby virtual object, based on the first session SLAM frame;
the processor executing infrared emitter power optimization system code instructions to set a first light intensity cap adjustable for the active IR light emitter based on whether the nearby virtual object is within a minimum active region of viewing or movement of the wearable headset information handling system is toward the virtual object outside the minimum active region such that it may enter the field of view within a threshold number of SLAM frames, where the first light intensity cap is set relative to the calibration distance, the calibration intensity, and the image projection distance of the nearby virtual object; and
the active IR light emitter emitting light at or below the first light intensity cap.

2. The information handling system of claim 1, wherein the calibration distance and the calibration intensity are linearly related.

3. The information handling system of claim 1, wherein the active IR light emitter is located within a minimum active region that includes a field of view of the wearable headset information handling system and a preset peripheral angle extending from both edges of the field of view.

4. The information handling system of claim 3, wherein the active IR light emitter is located within a rotation active region that includes a preset movement adjustment angle extending from an edge of the minimum active region in a detected movement direction of rotation further where the position sensor includes:
an inertial measurement unit detecting rotation of the wearable headset information handling system.

5. The information handling system of claim 1 further comprising:
the SLAM engine identifying a bearing to the virtual object; and
wherein the active IR light emitter is located in the active region that includes a preset peripheral angle extending from the bearing of the virtual object.

6. The information handling system of claim 1 further comprising:
the processor determining a second light intensity cap for the active IR light emitter based on an updated distance measured between the active IR light emitter and a farthest identified object in the first session SLAM frame, the first light intensity cap, and a second image projection distance of a virtual object depicted in a future predicted SLAM frame; and
the active IR light emitter emitting light set at or below the second light intensity cap.

7. The information handling system of claim 6, wherein the future predicted SLAM frame is within thirty frames of the first session SLAM frame.

8. A method of optimizing power of an infrared emitter comprising:
storing an association in a memory between each of a plurality of infrared (IR) light emitters mounted to a wearable headset and a calibration intensity at which an associated one of the plurality of IR light emitters emits light while a calibration simultaneous localization and mapping (SLAM) frame is generated;
receiving, via a network adapter, a calibration SLAM frame, a first session SLAM frame, and a future predicted SLAM frame;
identifying an active IR light emitter from the plurality of infrared light emitters, via a processor, based on a position of the active IR light emitter with respect to a field of view of the wearable headset;
determining, via the processor, a calibration distance between the active IR light emitter and a first farthest identified object based on the calibration SLAM frame, and determining an image projection distance between the active IR light emitter and a nearby virtual object, based on the predicted future SLAM frame where the predicted future SLAM frame is within a preset threshold number of frames of the first session SLAM frame;
determining, via the processor, a first light intensity cap for the active IR light emitter based on the calibration distance, the calibration intensity, and the image projection distance; and
transmitting an instruction to the wearable headset, via the network adapter, to emit light from the active IR light emitter at or below the first light intensity cap.

9. The method of claim 8, wherein the calibration distance and the calibration intensity are linearly related.

10. The method of claim 8, wherein the active IR light emitter is located within a minimum active region that includes a field of view of the wearable headset and a preset peripheral angle extending from both edges of the field of view.

11. The method of claim 10, wherein the active IR light emitter is located within a rotation active region that includes a preset movement adjustment angle extending from an edge of the minimum active region in a detected direction of rotation further comprising:
an inertial measurement unit detecting rotation of the wearable headset.

12. The method of claim 8 further comprising:
the SLAM engine identifying a bearing to a virtual object based on the future predicted SLAM frame; and
wherein the active IR light emitter is located in an active region that includes a preset peripheral angle extending in both horizontal directions from the bearing of the virtual object.

13. The method of claim 8, wherein determination of light intensity cap is adjustable based on position and movement of the wearable headset to increase light intensity of an active IR light emitter when used for viewing the nearby virtual object and decrease light intensity when not used for viewing the nearby virtual object.

14. The method of claim 8, wherein the preset threshold number of frames is between fifteen and forty five frames.

15. A wearable headset information handling system infrared emitter power optimization system comprising:
a memory storing an association between each of a plurality of infrared (IR) light emitters mounted to a wearable headset information handling system and a calibration intensity at which an associated one of the plurality of IR light emitters emits light while a calibration simultaneous localization and mapping (SLAM) frame is generated;
wherein the active IR light emitter is located within a minimum active region that includes a field of view of the wearable headset information handling system and a preset peripheral angle extending from both edges of the field of view;
a SLAM engine generating a first session SLAM frame;
a processor identifying an active IR light emitter from the plurality of infrared light emitters based on a position of the active IR light emitter with respect to the field of view of the wearable headset information handling system;
a SLAM engine determining a calibration distance between the active IR light emitter and a first farthest identified object based on the calibration SLAM frame, and determining an image projection distance between the active IR light emitter and a nearby virtual object, based on the first session SLAM frame;
the processor executing infrared emitter power optimization system code instructions to determine a first light intensity cap adjustable for the active IR light emitter based on the calibration distance, the calibration intensity, and the image projection distance of the nearby virtual object, where setting the first light intensity cap for the active IR light emitter is adjustable depending on position and movement of the wearable headset to increase light intensity of an active IR light emitter when used for viewing a position of the nearby virtual object and reduce light intensity when not used for viewing the position of the nearby virtual object; and
the active IR light emitter emitting light at or below the first light intensity cap.

16. The information handling system of claim 15, wherein the calibration distance and the calibration intensity are linearly related.

17. The information handling system of claim 15, wherein the active IR light emitter is located within a rotation active region that includes a preset movement adjustment angle extending from an edge of the minimum active region in a detected direction of rotation via a position sensor including an inertial measurement unit detecting rotation of the wearable headset information handling system.

18. The information handling system of claim 15 further comprising:

the SLAM engine identifying a bearing to a virtual object; and wherein determination is made whether the active IR light emitter is located in an active region that includes a preset peripheral angle extending from the bearing of the virtual object.

19. The information handling system of claim 15 further comprising:

the processor determining a second light intensity cap for the active IR light emitter based on an updated distance measured between the active IR light emitter and a farthest identified object in the first session SLAM frame, the first light intensity cap, and a second image projection distance of a virtual object depicted in a future predicted SLAM frame; and the active IR light emitter emitting light at or below the second light intensity cap.

20. The information handling system of claim 19, wherein the future predicted SLAM frame is within thirty frames of the first session SLAM frame.

* * * * *